(12) United States Patent
Blume

(10) Patent No.: US 7,591,450 B1
(45) Date of Patent: Sep. 22, 2009

(54) VALVE BODY AND SEAL ASSEMBLY

(76) Inventor: George H. Blume, 107 Morning Cloud Cove, Austin, TX (US) 78734

( * ) Notice: Subject to any disclaimer, the term of this patent is extended or adjusted under 35 U.S.C. 154(b) by 0 days.

(21) Appl. No.: 12/390,516

(22) Filed: Feb. 23, 2009

Related U.S. Application Data

(63) Continuation-in-part of application No. 11/219,261, filed on Sep. 2, 2005, now Pat. No. 7,513,483, and a continuation-in-part of application No. 10/179,804, filed on Jun. 25, 2002, now Pat. No. 6,955,181, and a continuation-in-part of application No. 09/836,043, filed on Apr. 16, 2001, now abandoned.

(51) Int. Cl.
   F16K 1/00 (2006.01)
   F16K 15/00 (2006.01)
(52) U.S. Cl. .................. 251/332; 251/333; 137/516.29
(58) Field of Classification Search ................ 251/318, 251/332, 333, 358; 137/516.29
   See application file for complete search history.

(56) References Cited

U.S. PATENT DOCUMENTS

| | | | |
|---|---|---|---|
| 4,307,140 A | 12/1981 | Davis | |
| 4,518,329 A | 5/1985 | Weaver | |
| 4,676,481 A | 6/1987 | Hayes | |
| 4,842,287 A | 6/1989 | Weeks | |
| 4,860,995 A | 8/1989 | Rogers | |
| 5,052,435 A | 10/1991 | Crudup et al. | |
| 5,088,521 A | 2/1992 | Johnson | |
| 5,193,577 A | 3/1993 | de Koning | |
| 5,249,600 A | 10/1993 | Blume | |
| 5,345,965 A | 9/1994 | Blume | |
| 5,538,029 A | 7/1996 | Holtgraver | |
| 6,189,894 B1 * | 2/2001 | Wheeler | 277/549 |

* cited by examiner

Primary Examiner—John K Fristoe, Jr.
(74) Attorney, Agent, or Firm—Dennis W. Gilstad

(57) ABSTRACT

A valve body and seal assembly comprises a valve body having one or more circumferential seal retention grooves and a dual-durometer elastomeric seal cast-in-place in at least one groove. Each seal comprises first and second sections in contact along a substantially non-planar intra-seal interface. First seal sections typically comprise polyurethane having a higher modulus than the polyurethane typically comprising second seal sections. Residual elastomer shrinkage stress present after curing of a cast-in-place dual-durometer elastomeric seal is redistributed within the seal sections to maintain beneficial preload. Seal configurations described herein are also associated with decreased shear-related elastomer fatigue and extrusion damage associated with repeated valve seat impact. Valve service life is increased by beneficial preload maintained by the synergistic interaction of first and second seal sections.

16 Claims, 15 Drawing Sheets

VALVE BODY AND SEAL ASSEMBLY

This is a continuation-in-part patent application (CIP) of copending U.S. Ser. No. 11/219,261, which was filed Sep. 2, 2005, which was a CIP of U.S. Ser. No. 10/179,804 which was filed Jun. 25, 2002 (now U.S. Pat. No. 6,955,181), which was a CIP of U.S. Ser. No. 09/836,043 which was filed Apr. 16, 2001 (now abandoned).

FIELD OF THE INVENTION

The present invention relates generally to valves suitable for abrasive fluids under high pressures.

BACKGROUND

Valve terminology varies according to the industry (e.g., pipeline or oil field service) in which the valve is used. In some applications, the term "valve" means just the moving element, whereas in other applications the term "valve" includes the moving element, the valve seat, and the housing that contains the moving element and the valve seat. In the following disclosure, a valve suitable for high-pressure abrasive fluids, such as oil field drilling mud, comprises a valve body and seal assembly (the moving element) and a corresponding valve seat.

A valve body and seal assembly typically incorporates an elastomeric seal within a circumferential seal retention groove of the valve body. Examples of valve bodies having an elastomeric seal in a circumferential seal retention groove include a web-seat stem-guided valve body (see, e.g., FIG. 1B) or an open-seat stem-guided valve body (see, e.g., FIG. 1C). Such valve body and seal assemblies are commonly found in valves mounted in the fluid end of a high-speed pump incorporating positive displacement pistons or plungers in multiple cylinders (e.g., a mud pump). If preformed seals are to be used, such a groove requires finish machining to closely match the dimensions of seals like the "snap-on" type or seals secured with a removable seal retention plate.

Such groove finish machining may be reduced or eliminated if an elastomer (characterized when cured by a durometer valve, a hardness value and/or a modulus) is cast and cured in the groove (herein "cast-in-place") to form a single-durometer seal. Further, cast-in-place seals may be mechanically locked to a valve body by forming them over interengaging or interlocking (herein "interdigitating") projecting-receiving formations on the valve body. Such interdigitation of valve body and seal has become a common structural feature of cast-in-place seals that is difficult or impossible to find in "snap-on" type seals. See, for example, U.S. Pat. No. 4,860,995 (incorporated herein by reference). But manufacture of valve bodies with interdigitating cast-in-place seals, such as those described in the '995 patent, has historically involved added costs. These added costs arose because, as described in the '995 patent, the seals are preferably bonded to a valve body to increase overall integrity. Such bonding creates new problems associated with stress in the seal elastomer.

FIG. 1A indicates typical areas of high elastomer stress and associated premature seal failure expected in bonded seals on valve bodies. Note that the '995 patent does not discuss seal failure due to high elastomer stress at all. On the contrary, the '995 patent describes increased overall valve integrity associated with the bonding of valve seal inserts to a valve body.

Even though the manufacturing cost of valve bodies for bonded cast-in-place seals is almost identical to the analogous cost of valve bodies for "snap-on" seals, the added cost of preparing a valve body for bonding increases the cost of the valve to the point that valves with bonded seals have not been competitive on price. The added costs of bonding include cleaning the valve groove of all oil and contaminants, applying a bonding adhesive, and storing the valves in a low-humidity, dust-free environment while the valves await casting, bonding, and curing of the seal material (typically polyurethane) on the valve body. Proper care in these steps may moderate subsequent stress-related damage to the seal and/or the valve body itself (especially the valve body flange).

Valve body flange stresses (and the associated fatigue failures) may be reduced to a limited extent, and valve sealing improved, by a properly-placed elastomeric seal which contacts the valve seat sealing surface evenly on closure (just before contact of the valve body impact area with the valve seat sealing surface). Improper placement of this seal, however, leads to an out-of-round condition that may actually increase leaks and hasten valve failure. Each leak of high-pressure fluid tends to literally wash away a portion of the hardened steel of a valve body and/or valve seat. Multiple and near-simultaneous failures of this kind in web-seat stem-guided valves may give a failed valve body flange the appearance of a wrinkled cupcake paper.

Further, leaks due to poor placement of cast-in-place elastomeric seals often occur secondary to failure of the elastomer adjacent to the special adhesive that bonds the seal to the seal retention groove. If a portion of the seal is tightly bonded to the groove wall, residual shrinkage stress within the seal elastomer will increase as the elastomer cures because the seal as a whole tends to shrink away from substantially radially-extending walls to which it is bonded. Deleterious effects of this residual elastomer shrinkage stress (i.e., elastomer stress that is present even when the seal is not in contact with a valve seat) may be significantly aggravated when combined with the elastomer stresses (see below) which arise when a valve body and seal assembly is closing against its valve seat. The resulting combined elastomer stress tends to reduce the service life of the seal by predisposing it to shear-related fatigue failures (e.g., cracking, tearing and/or extrusion). FIG. 1A schematically illustrates an example of such stress-induced tearing in an elastomeric seal on a valve body.

By including a schematic representation of a valve seat, FIG. 1A also shows the proximity of a shear-related fatigue failure to the portion of an elastomeric seal that would be subject to extrusion as the valve body mates with the valve seat. The requirement that a valve seal make contact with the valve seat just prior to metal-to-metal contact between the valve body impact area and the valve seat sealing surface means that the seal elastomer is subjected to strong pressure forces as the valve is closing. Additionally, since movement of the seal against the valve seat is restricted by friction, by the metal of the valve body impact area, and by the valve seat itself, a portion of the seal elastomer tends to be extruded into the (schematically shown) extrusion gap as the seal slides down the face of the valve seat on valve closing. Thus, a portion of the seal tends to be repeatedly deformed by this extrusion process each time the valve closes. Sliding shear stress due to this deformation combines with the residual elastomer shrinkage stress and pressure shear stress noted above to precipitate premature failures like the illustrated tear.

To avoid the extra costs of adhesive application and the induced residual elastomer shrinkage stress associated with curing of cast-in-place adhesively-bonded seals, a deformable seal may be stabilized in a groove by serrations on the opposing sides of a seal retention groove. Stabilization of this general type is termed mechanical locking in the '995 patent. Serrations for this purpose are illustrated in U.S. Pat. No.

4,676,481 (incorporated herein by reference). While effective for limiting seal movement within the groove, serrations arranged in this manner can themselves raise shear stress in both the groove walls and the elastomer, thus further predisposing the valve body and seal assembly to premature failure.

SUMMARY

The invention relates to valves and valve components, including improved valve body and seal assemblies (i.e., valve body and seal assemblies described herein) which facilitate maintenance of beneficial preload while reducing shear-related fatigue failures and extrusion damage, thereby lengthening valve service life. A first embodiment of a valve body and seal assembly has a longitudinal axis, the valve body and seal assembly comprising a valve body substantially symmetrical about the longitudinal axis. The valve body has at least one circumferential seal retention groove and a frusto-conical valve body impact area for contacting a valve seat. The valve body and seal assembly first embodiment further comprises an elastomeric seal cast-in-place in at least one circumferential seal retention groove.

Each elastomeric seal is substantially symmetrical about the longitudinal axis and comprises a first seal section having a frusto-conical external surface portion for contacting a valve seat. The first seal section comprises a first polyurethane. Each elastomeric seal further comprises a second seal section, at least a portion of the second seal section lying between one circumferential seal retention groove and at least a portion of the first seal section. The second seal section contacts the first seal section along a substantially non-planar intra-seal interface, and the second seal section comprises a second polyurethane having a lower modulus than the first polyurethane. Further, the substantially non-planar intra-seal interface comprises at least one frusto-conical portion substantially geometrically similar to the frusto-conical valve body impact area and substantially geometrically similar to the first seal section frusto-conical external surface portion.

The above first embodiment may be contrasted with seal assemblies that incorporate two polyurethane compositions having different moduli (commonly described using the term dual-durometer). The use of two elastomers of different moduli implies that the two elastomers exhibit different hardness (or durometer valves), the higher hardness (durometer value) being associated with the higher modulus elastomer. See, e.g., dual-durometer urethane seals such as the Dual-Duro® by Southwest Oilfield Products, Inc. and Green Duo dual-durometer products offered by National Oilwell Varco, Inc.). Such commercial dual-durometer seals are relatively difficult and expensive to produce with uniformly predictable characteristics. In particular, failure of the seal bonds at the substantially planar interfaces typically found between harder and softer seal elastomers has caused failure of entire seals.

But the dual-durometer valve body and seal assemblies described herein are significantly less susceptible to failure due to problems with a bond between their first and second seal sections. Indeed, certain valve body and seal assembly embodiments described herein do not even require such a bond. Rather, other reasons underlie the long service lives of valve body and seal assemblies described herein, among these reasons being the synergistic functions associated with the geometries of first and second seal sections and the corresponding valve body.

For example, in the valve body and seal assemblies described herein, the intra-seal interface is substantially non-planar. Being substantially non-planar means that the intra-seal interface comprises at least one non-planar portion (for example, a frusto-conical or cylindrical portion substantially coaxial with one or more other valve body and seal assembly structures). Further in certain embodiments, a non-planar portion of an intra-seal interface may be substantially geometrically congruent with or substantially geometrically similar to another valve body and seal assembly structure. And as explained herein, force transmitted from a second seal section to a first seal section, the force having been hydraulically redistributed within the second seal section, will be substantially normal to at least a portion of the intra-seal interface. This minimizes transmission of shear force across the intra-seal interface.

A second embodiment of a valve body and seal assembly has a longitudinal axis, the valve body and seal assembly comprising a valve body substantially symmetrical about the longitudinal axis. The valve body has at least one circumferential seal retention groove and a frusto-conical valve body impact area for contacting a valve seat. The second embodiment of a valve body and seal assembly further comprises an elastomeric seal cast-in-place in at least one of the circumferential seal retention grooves, each elastomeric seal being substantially symmetrical about the longitudinal axis.

The elastomeric seal of the second embodiment of a valve body and seal assembly comprises a first seal section having a frusto-conical external surface portion for contacting a valve seat, the first seal section comprising a first polyurethane. And the elastomeric seal further comprises a second seal section, at least a portion of the second seal section lying between one circumferential seal retention groove and at least a portion of the first seal section. The second seal section contacts the first seal section along a substantially non-planar intra-seal interface, and the second seal section comprises a second polyurethane having a lower modulus than the first polyurethane. The substantially non-planar intra-seal interface comprises at least one cylindrical portion coaxial with said first seal section.

A third embodiment of a valve body and seal assembly has a longitudinal axis, the valve body and seal assembly comprising a valve body substantially symmetrical about the longitudinal axis. The valve body has at least one circumferential seal retention groove and a frusto-conical valve body impact area for contacting a valve seat. The third embodiment of a valve body and seal assembly further comprises an elastomeric seal cast-in-place in at least one circumferential seal retention groove, the elastomeric seal being substantially symmetrical about the longitudinal axis.

The elastomeric seal of the third embodiment of a valve body and seal assembly comprises a first seal section having a frusto-conical external surface portion for contacting a valve seat, the first seal section comprising a first polyurethane. And the elastomeric seal further comprises a second seal section, at least a portion of the second seal section lying between one circumferential seal retention groove and at least a portion of the first seal section. The second seal section contacts the first seal section along a substantially non-planar intra-seal interface. And the second seal section comprises a second polyurethane, the second polyurethane having a lower modulus than the first polyurethane. The substantially non-planar intra-seal interface comprises at least one frusto-conical portion not substantially geometrically similar to the frusto-conical valve body impact area.

In any embodiment of a valve body and seal assembly described herein, the second seal section may be cast-in-place before the first seal section. When the first seal section is subsequently cast-in-place, it will tend to shrink about the second seal section, generating residual shrinkage stress within both the first and second seal sections. These residual shrinkage stresses will tend to hold the first and second seal sections in contact along the intra-seal interface, allowing the valve body and seal assembly to function effectively as a unit while benefiting from the differing characteristics of the assembly components. Residual shrinkage stress also contributes to forces substantially normal to at least a portion of the substantially non-planar intra-seal interface which tend to maintain beneficial preload.

Such effective function to provide first seal section preload may be seen in the first, second and third embodiments described herein. In these embodiments the relatively lower modulus of the polyurethane of the second seal section (relative to the polyurethane of the first seal section) allows the second seal section to substantially hydraulically redistribute force transmitted across the intra-seal interface from the first seal section. For example, force secondary to valve seat impact, which is transmitted across the intra-seal interface from the first seal section to the second seal section, is hydraulically redistributed in the second seal section and then retransmitted from the second seal section to the first seal section. This retransmitted force will have a substantial component normal to at least a portion of the intra-seal interface, while any shear component(s) of retransmitted force will be relatively smaller than the normal component. Such relatively smaller retransmitted shear force component(s) will thus tend to minimize disadvantageous shear-related fatigue failures at or near the intra-seal interface, thereby tending to lengthen seal service life In the dual-durometer valve body and seal assemblies described herein, the relatively higher modulus (i.e., harder) elastomers suitable for the first seal section typically exhibit good abrasion and extrusion resistance but relatively little preload memory to facilitate their sealing against a valve seat. The first seal section frusto-conical external surface portion experiences repeated direct initial contact with a valve seat just prior to contact of the valve seat with the valve body impact area (the first seal section frusto-conical external surface portion projecting slightly beyond the valve body impact area before contact with a valve seat). This initial contact exposes the first seal section to forces substantially normal to the valve seat as well as shear forces substantially parallel to the direction of travel as the first seal section slides slightly down the valve seat sealing surface. The sliding motion tends to extrude and also to wear the first seal section because of abrasive particulate matter trapped between the first seal section and the valve seat sealing surface. But the relative hardness of the first seal section tends to minimize abrasion and extrusion damage to the seal elastomer.

Note that the maintenance of beneficial preload by the second seal sections allows use of unusually hard (i.e., relatively high durometer value) elastomers in the first seal sections of embodiments of piston hub and seal assemblies described herein. While such relatively hard first seal section elastomers have little preload memory themselves, they nevertheless demonstrate maintenance of sufficient preload in use due to the persistent influence of preload force transmitted across the intra-seal interface from the corresponding first seal sections (with their lower durometer values and consequently relatively better preload memory). The relatively hard first seal section elastomers, in turn, exhibit exceptional extrusion and abrasion resistance.

Such first seal section resistance to extrusion and/or abrasion damage is substantially greater than would be expected in a single-durometer or dual-durometer seal with a planar interface between seal sections. This damage reduction is achieved because elastomers for the second seal section are chosen to be relatively softer (i.e., have lower modulus) than elastomers for the first seal section. Being softer, these second seal section elastomers also exhibit relatively greater accommodation (through slight temporary distortion) of sliding movements of the first seal section. At the same time, these second seal section elastomers have better memory than first seal section elastomers for residual shrinkage stress which contributes to beneficial preload and which is developed as the seals are cast-in-place. As described herein, the resulting cast-in-place dual-durometer seals have synergistic combinations of functional structures and desirable performance characteristics that are not found in other seals, whether single-durometer or dual-durometer.

An important component of desirable seal performance is maintenance of adequate preload to facilitate sealing against a valve seat sealing surface. In each of the valve body and seal assembly embodiments described herein, the first and second seal sections may be cast-in-place using certain methods to obtain (and maintain) such desired seal properties as adequate preload. For example, the second seal section may be allowed to completely cure before the first seal section is cast in contact with it. Under such conditions, the first seal section will typically shrink tightly around the second seal section during curing, thus compressing at least a portion of the second seal section. After curing of both the first and second elastomeric seal sections, two types of preload will then exist when such a valve body and seal assembly is inserted in a valve.

The first preload type will originate in the first seal section as it is compressed against the second seal section by contact with a valve seat and as it resists the sliding movement down a valve seat described above. And the second preload type will be indirectly due to force transmitted from the first seal section to the second seal section across the intra-seal interface. This transmitted force is hydraulically redistributed by the second seal section and then retransmitted back to the first seal across the intra-seal interface. Because it has been hydraulically redistributed in the second seal section, the retransmitted force tends to cross the intra-seal interface oriented substantially normal to at least a portion of the intra-seal interface. So little or no shear force is thus retransmitted across the intra-seal interface.

While the magnitude of the first preload type may decrease over time due to frictional wear and shear-related fatigue of the first seal section elastomer, the magnitude of the second preload will tend to remain substantially constant because the second seal section is substantially protected from both frictional wear and shear-related fatigue by the presence of the first seal section. Thus, the first and second seal sections will function synergistically to maintain an effective preload level necessary for sealing efficiency throughout the service life of the valve body and seal assemblies described herein.

The synergistic seal function noted above represents an improvement in elastomeric seal performance over that obtainable with a seal that comprises a single seal section that is cast-in-place and cured in direct contact with a valve body or an analogously-shaped mold (i.e., a single-durometer seal). In such a single-durometer seal, relatively high residual preload associated with elastomer shrinkage would tend to develop in the seal elastomer as it cures. Such residual preload initially is useful for improving sealing against a valve seat sealing surface. But this benefit tends to diminish rapidly in use. Instead of maintaining adequate preload, the substantial frictional wear and shear-related fatigue experienced by the seal during high-pressure pumping tends to soften the seal elastomer and leave it with little memory of the earlier-developed beneficial preload.

In contrast, the dual-durometer valve body and seal assemblies described herein include the presence of a relatively compliant second seal section, at least portions of which lie between at least portions of the first seal section and the valve body. The higher compliance of the second seal section tends to be associated with better memory of the beneficial preload developed within it during curing. So even though the first seal section tends to lose much of its initial preload due to shear-related fatigue and wear, the second seal section preload is substantially maintained and continues to be transmitted substantially normally across at least a portion of the intra-seal interface to facilitate effective sealing of a first seal section against a valve seat.

In certain of the several embodiments of a valve body and seal assembly described herein, the first seal section first polyurethane may not be bonded with the second seal section second polyurethane at the intra-seal interface because of the relatively small shear forces transmitted across the interface. Alternatively, the first seal section first polyurethane may be bonded with the second seal section second polyurethane at the intra-seal interface. Further, the first seal section may, or alternatively, may not additionally comprise a cylindrical external surface portion. Still further, the first seal section may comprise polyurethane of about 95 durometer Shore A hardness to about 60 durometer Shore D hardness, and the second seal section may comprise polyurethane of about 75 to about 85 durometer Shore A hardness.

Any of the several embodiments of a valve body and seal assembly described herein may also comprise a second seal section which itself comprises at least one external surface portion, or alternatively, comprises no external surface portion. Further, a valve may comprise any of the several embodiments of a valve body and seal assembly described herein, plus a corresponding valve seat.

DETAILED DESCRIPTION

Figure 3:
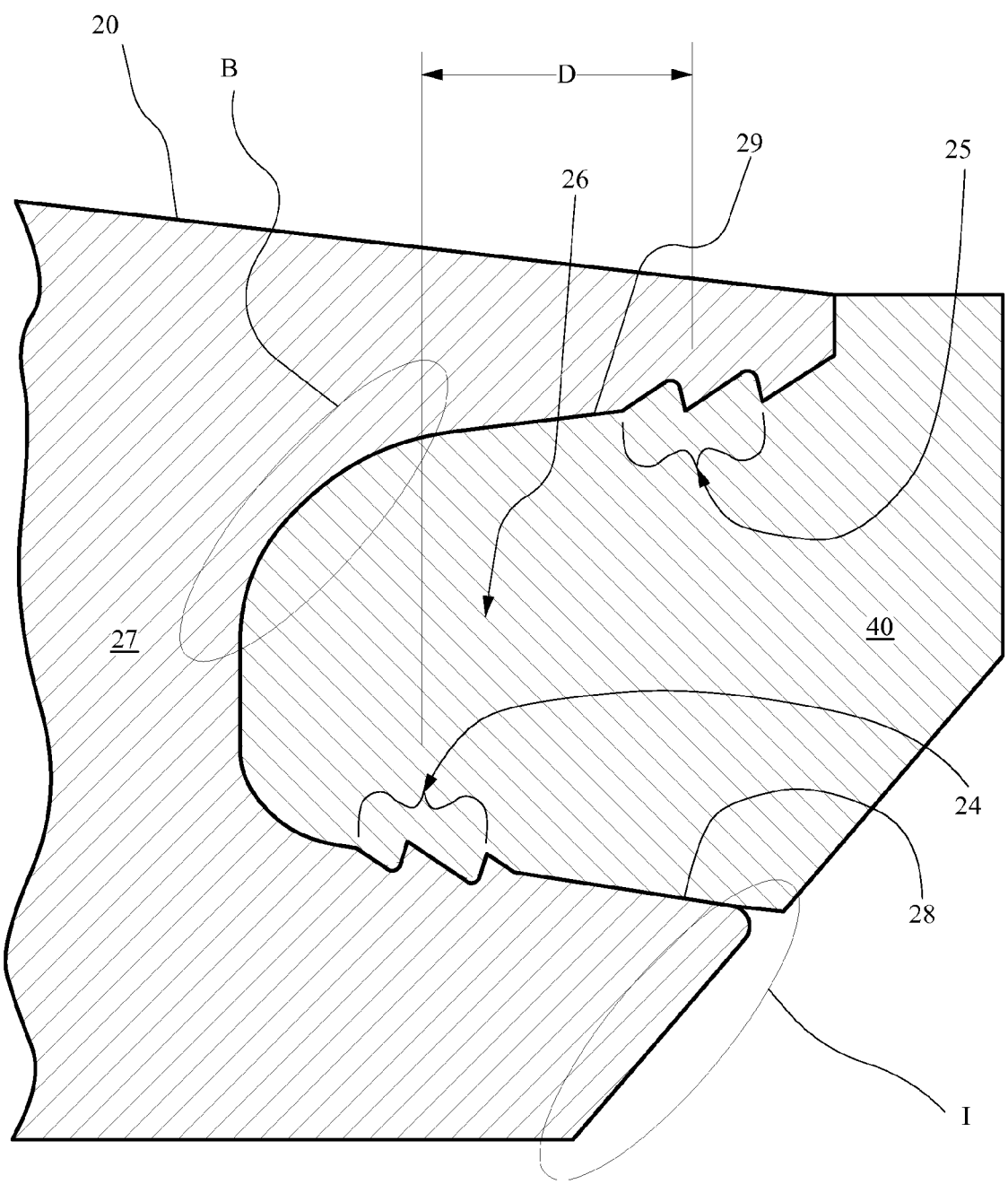
FIG. 3 schematically illustrates an enlarged view of a circumferential seal retention groove section similar to that shown in FIGS. 1B and 2, indicating areas of maximum impact stress and maximum bending stress.
Figure 4:
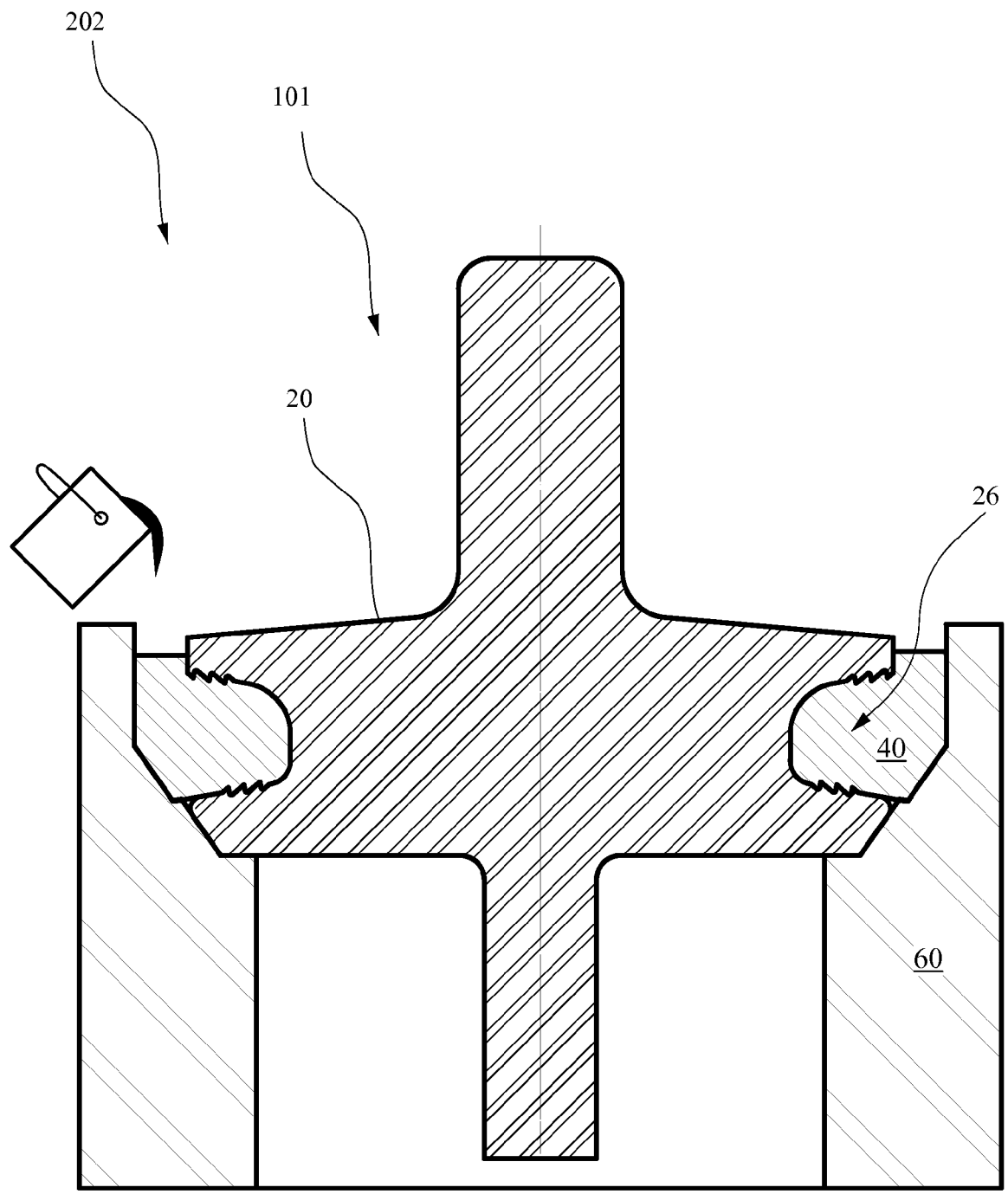
FIG. 4 schematically illustrates a cross-section showing casting-in-place of a single-durometer elastomeric seal in a mold comprising a mold shell mated with a valve body.
Figure 5:
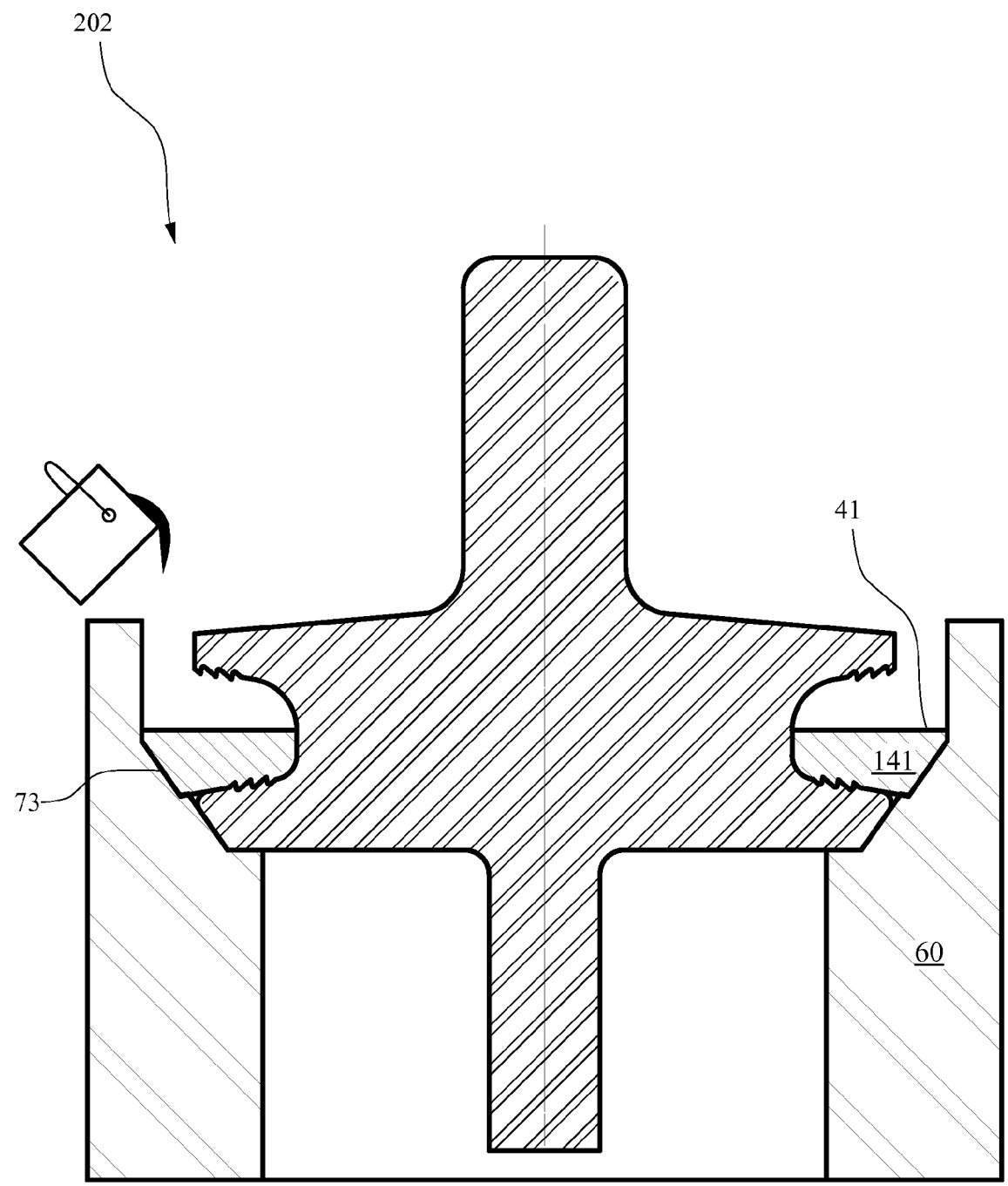
FIG. 5 is analogous in part to FIG. 4 but schematically illustrates the cured first elastomer comprising the first portion of a cast-in-place dual-durometer elastomeric seal; a second elastomer is shown being pored for casting-in-place the second seal portion, with a planar interface between the two seal portions.
Figure 6:
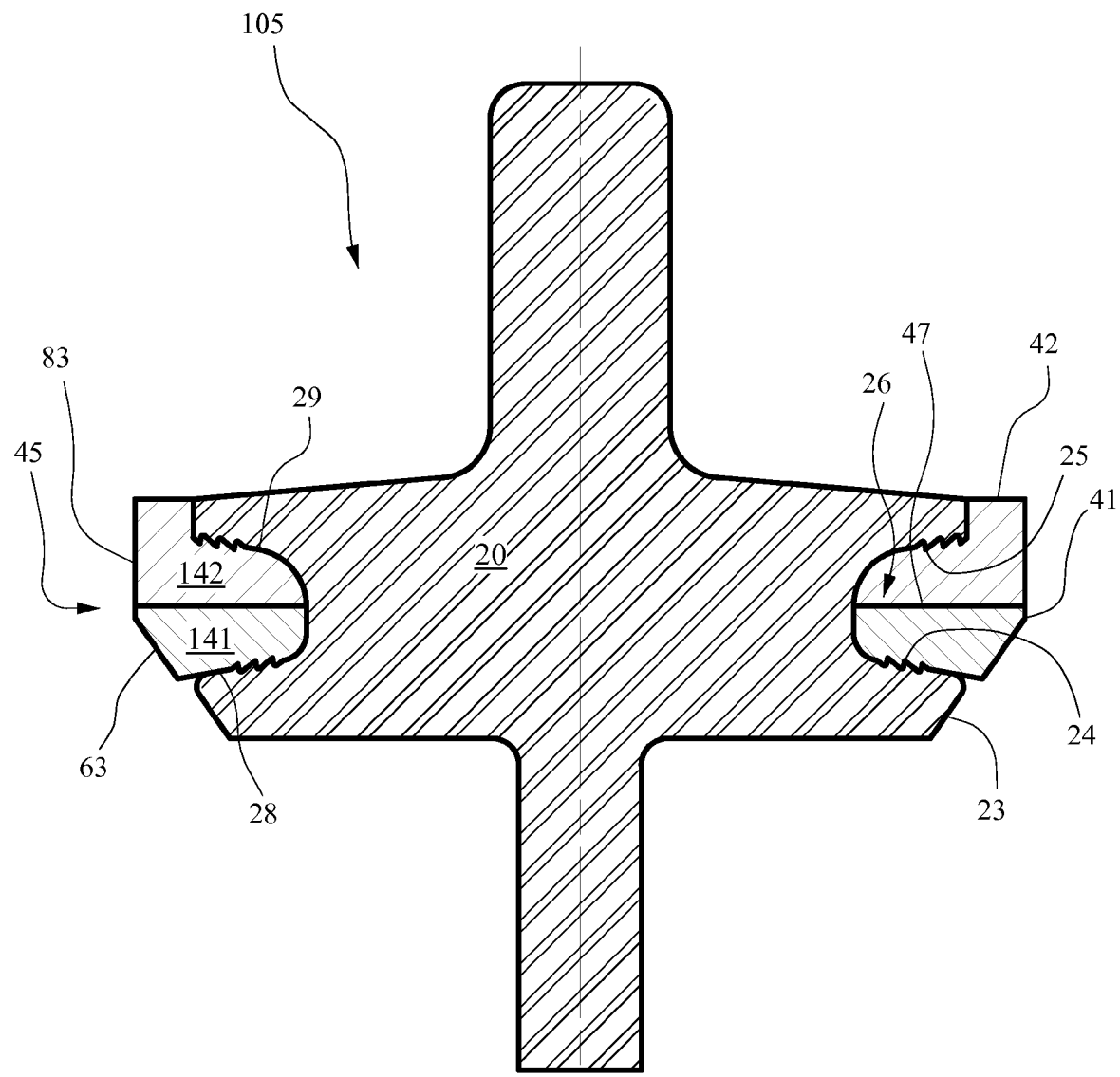
FIG. 6 is analogous in part to FIG. 5 but schematically illustrates a cured and finish machined dual-durometer cast-in-place elastomeric seal having a planar interface between the two seal portions.

FIGS. 1A-1C, 3 and 4 schematically illustrate single-durometer elastomeric seals, while FIGS. 5 and 6 relate to dual durometer elastomeric seals having a planar interface. FIGS. 7-11 relate to dual durometer elastomeric seals having a non-planar interface. Comparisons among the Figures, including FIG. 2, can illuminate the analogous structures as well as the unique features associated with each seal type.

Figure 1A:
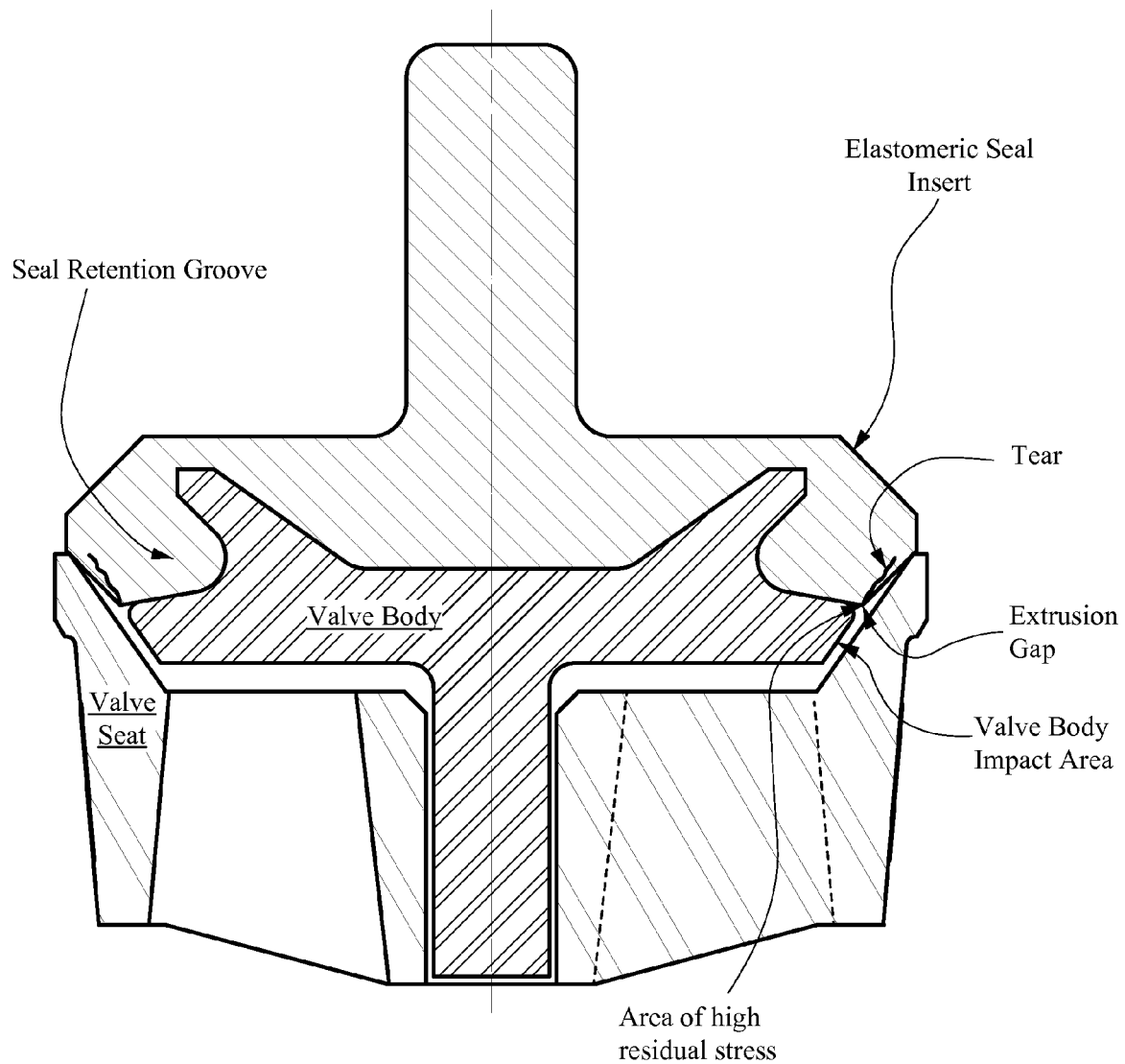
FIG. 1A schematically illustrates typical shear-related fatigue failures of cast-in-place elastomeric seals that are bonded on a valve body.
Figure 1B:
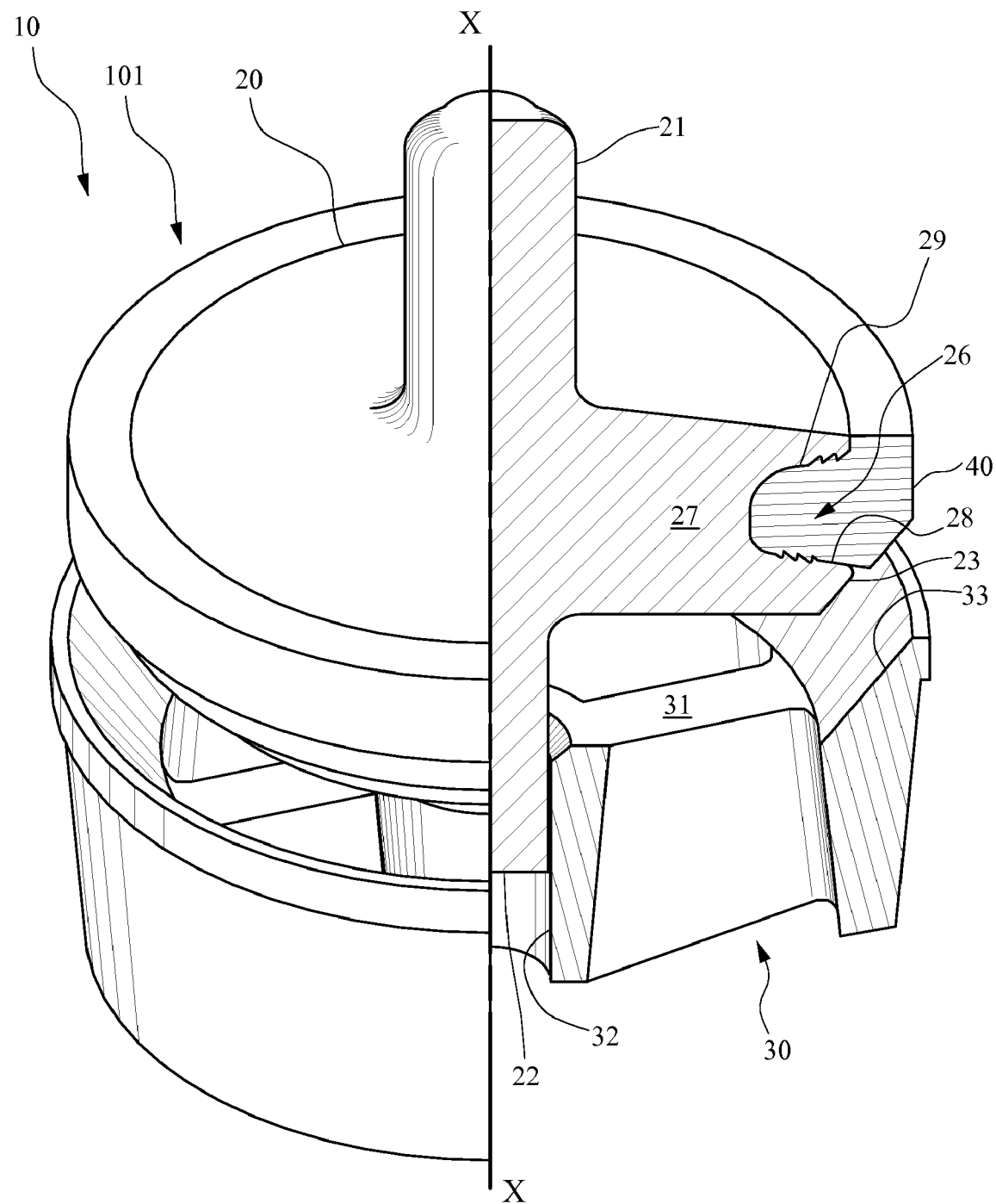
FIG. 1B schematically illustrates a partial cross-section of a stem-guided web-seat valve comprising a valve seat with a valve body and seal assembly having a single-durometer seal.

FIG. 1B schematically illustrates a web-seat, stem-guided valve 10 comprising a valve seat 30 with a valve body and seal assembly 101. Valve seat 30 comprises sealing surface 33 connected to stem guide 32 by a plurality of webs 31. Valve body and seal assembly 101 comprises a stem-guided valve body 20, and a single-durometer elastomeric seal 40 in a circumferential seal retention groove 26. Valve body 20 comprises guide stem 21 and guide stem 22, guide stem 22 lying within stem guide 32 of valve seat 30. Valve body 20 also comprises flange 27, which in turn comprises first and second groove walls 28 and 29 respectively of circumferential seal retention groove 26. First groove wall 28 is near valve body impact area 23 of valve body 20. When valve 10 closes, valve body impact area 23 of valve body 20 strikes sealing surface 33 of valve seat 30, causing relatively high impact stress in valve body impact area 23 and adjacent areas of the periphery of first seal retention groove wall 28.

Figure 1C:
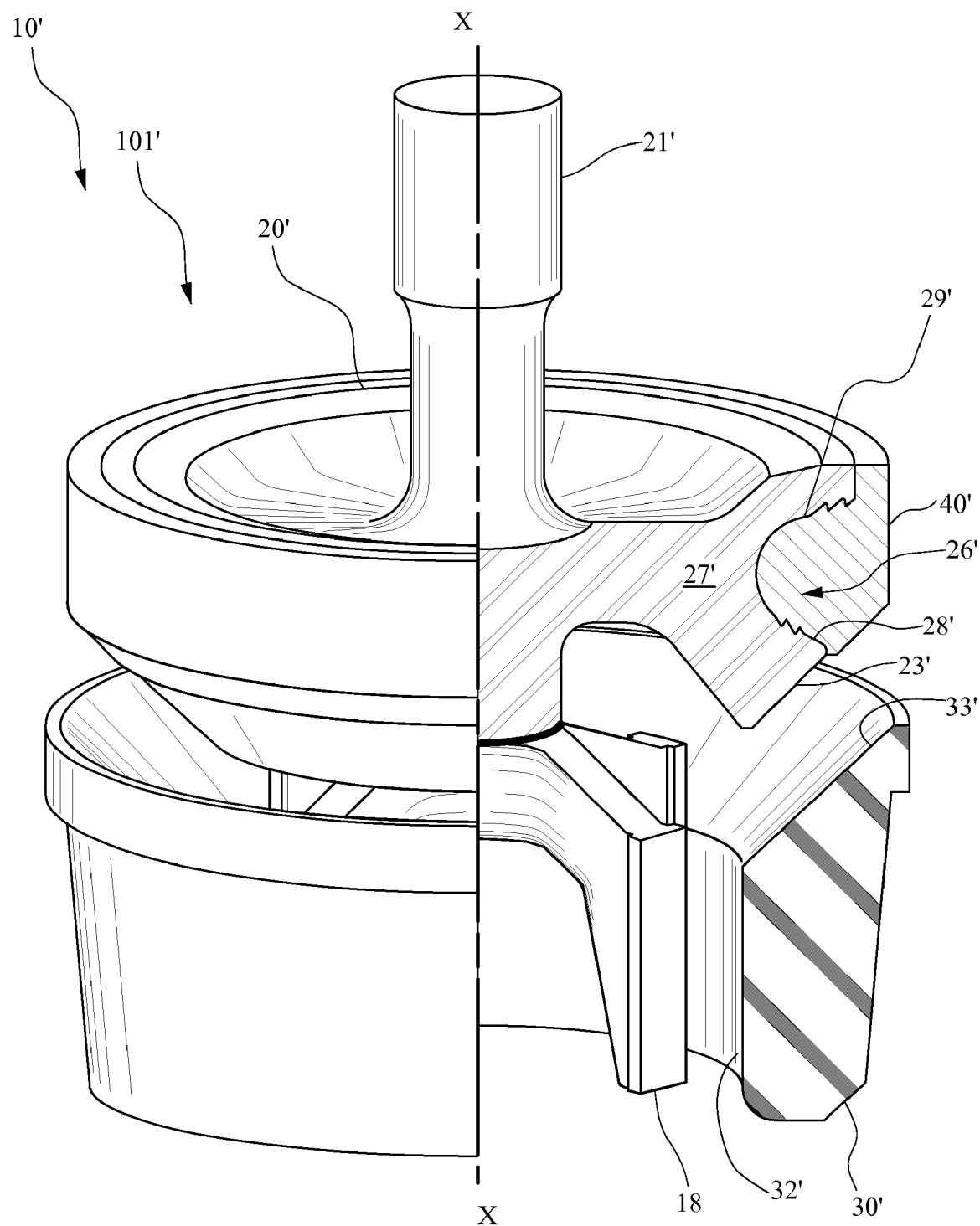
FIG. 1C schematically illustrates a partial cross-section of a stem-guided open-seat, valve comprising a valve seat with a valve body and seal assembly having a single-durometer seal.

FIG. 1C schematically illustrates an open-seat, stem-guided valve 10' analogous in part to the web-seat, stem-guided valve 10 of FIG. 1B. Valve 10' in FIG. 1C comprises several structural features (and groups of structural features) labeled with primed numerals because they are analogous in part to structural features having the unprimed numeral label in FIG. 1B. For example, valve 10' comprises a valve seat 30' with a valve body and seal assembly 101'. Valve seat 30' comprises sealing surface 33'. Valve body and seal assembly 101' comprises a stem-guided valve body 20' having a characteristic Channel-Beam shape and a single-durometer elastomeric seal 40' in a circumferential seal retention groove 26'. Valve body 20' comprises guide stem 21' and a plurality of valve guide feet 18 lying within open valve seat 30', guide feet 18 being guided by cylindrical sidewall 32' of valve seat 30'. Valve body 20' also comprises Channel-Beam 27' (analogous in part to flange 27 in FIG. 1B), which in turn comprises first and second groove walls 28' and 29' respectively of circumferential seal retention groove 26'. First groove wall 28' is near valve body impact area 23' of valve body 20'. When valve 10' closes, valve body impact area 23' of valve body 20' strikes sealing surface 33' of valve seat 30', causing relatively high impact stress in valve body impact area 23' and adjacent areas of the periphery of first seal retention groove wall 28'.

Figure 2:
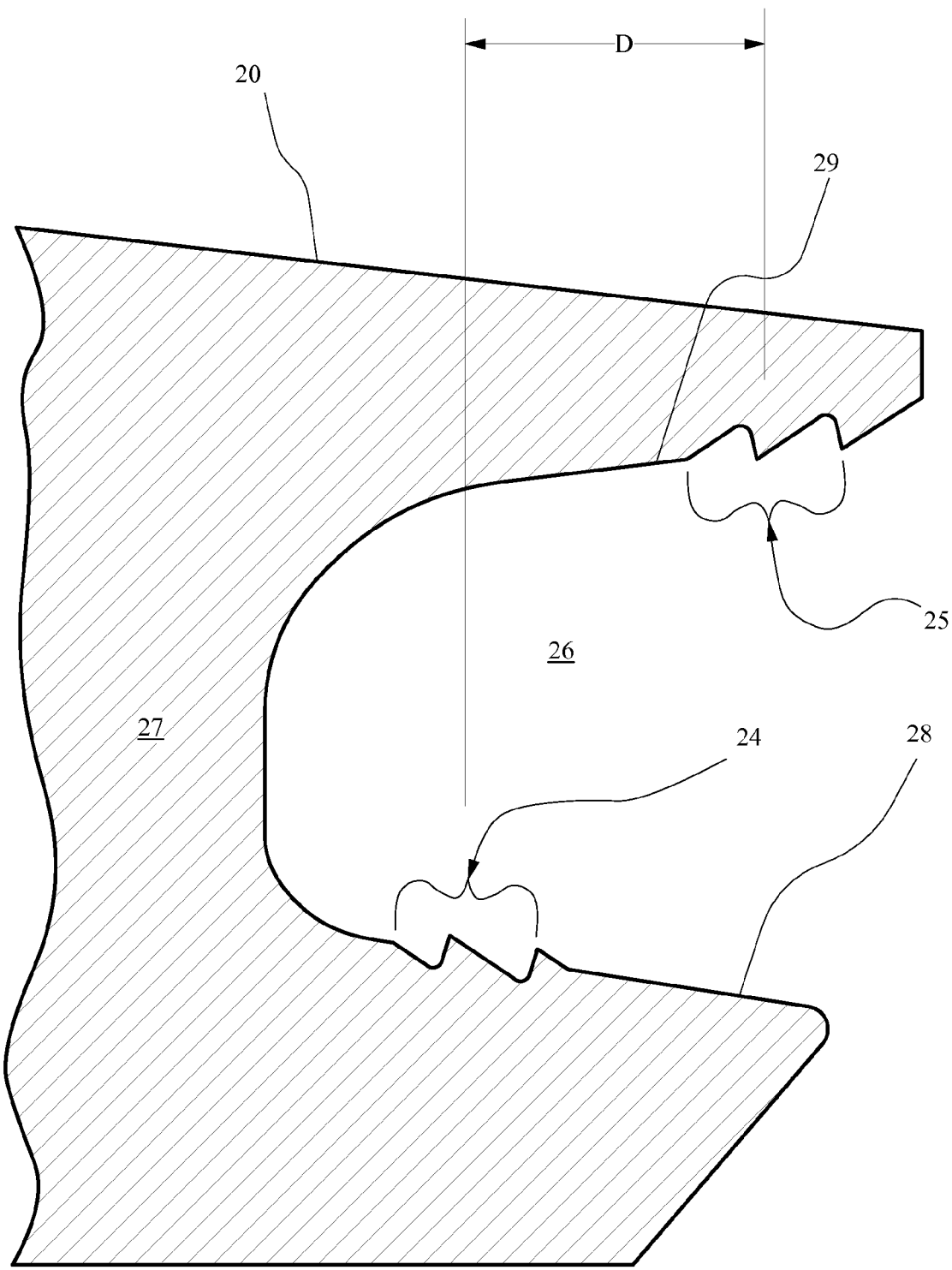
FIG. 2 schematically illustrates an enlarged partial cross-section of the valve body of FIG. 1B comprising a circumferential seal retention groove having offset serrations and adhesion-inhibiting surfaces.

FIG. 2 schematically illustrates an enlarged partial cross-section of valve body 20 as shown in FIG. 1B but without seal 40. Serration group 25 is shown offset peripherally a distance D from serration group 24. Serration group 24 on first groove wall 28 of circumferential seal retention groove 26 is located as far centrally as practicable (i.e., as close to the longitudinal axis of symmetry x-x of valve body 20 as practicable). Conversely, serration group 25 on second groove wall 29 is located as far peripheral as practicable (i.e., as far from the longitudinal axis of symmetry x-x of valve body 20 as practicable). Distance D represents the difference in the mean of distances measured from the longitudinal axis x-x to serrations in serration group 25, minus the mean of distances measured from the longitudinal axis x-x to serrations in serration group 24.

FIG. 3 schematically illustrates an enlargement of the partial cross-section of valve body 20 shown in FIG. 1B. In addition to showing serration group 25 offset peripherally a distance D from serration group 24, FIG. 3 shows areas of circumferential seal retention groove 26 which are subjected to high bending stress (area B), as well as areas of groove 26 which are subjected to high impact stress (area I).

FIG. 4 schematically illustrates a mold 202 comprising a circumferential seal retention groove 26 of a valve body 20 (see also FIG. 1B). Mold 202 also comprises mold shell 60, which mates with valve body 20. In use, mold shell 60 is temporarily mated with valve body 20 to form mold 202. Liquid elastomer (liquid urethane for example) is poured into mold 202 and cured therein to form a single-durometer cast-in-place elastomeric seal 40. During curing of seal 40, normal shrinkage of the elastomer takes place without appreciable adhesion of seal 40 to surfaces of mold 202 because these are adhesion-inhibiting surfaces. After seal 40 is cured, mold shell 60 will be removed, leaving a single-durometer valve body and seal assembly 101. Only minor machining of seal 40 may be required after removal of mold shell 60.

FIG. 5 schematically illustrates a cross-section showing a cast-in-place first section 41 of a dual-durometer elastomeric seal 45 (see FIG. 6) in a mold 202 (analogous in part to mold 202 shown in FIG. 4). After casting-in-place second seal section 42 in a manner analogous in part to that illustrated in FIG. 5, followed by removal of the mold shell 60, a dual-durometer valve body and seal assembly 105 is produced as schematically illustrated in FIG. 6.

Specifically, FIG. 6 schematically illustrates a (dual-durometer) valve body and seal assembly 105 having a longitudinal axis of symmetry and comprising a peripheral seal retention groove 26 spaced apart from the longitudinal axis. Seal retention groove 26 has first and second opposing groove walls 28 and 29 respectively. A valve body impact area 23 for contacting a valve seat is peripherally located on first opposing groove wall 28 of circumferential seal retention groove 26, and circular serrations 24 and 25 are located on the first and second opposing groove walls 28 and 29 respectively of circumferential seal retention groove 26. An elastomeric seal 45 is cast-in-place in peripheral seal retention groove 26, and elastomeric seal 45 comprises a first seal section 41 contacting a second seal section 42 at a planar interface 47. First seal section 41 comprises a peripheral frusto-conical surface 63 for contacting a valve seat, frusto-conical surface 63 being adjacent to the valve body impact area 23. And first seal section 41 comprises relatively high modulus polyurethane 141. Second seal section 42 comprises a peripheral surface 83 adjacent to peripheral frusto-conical surface 63, at least a portion of second seal section 42 comprising polyurethane 142 having a lower modulus than the relatively high modulus polyurethane 141 of first seal section 41.

Figure 7A:
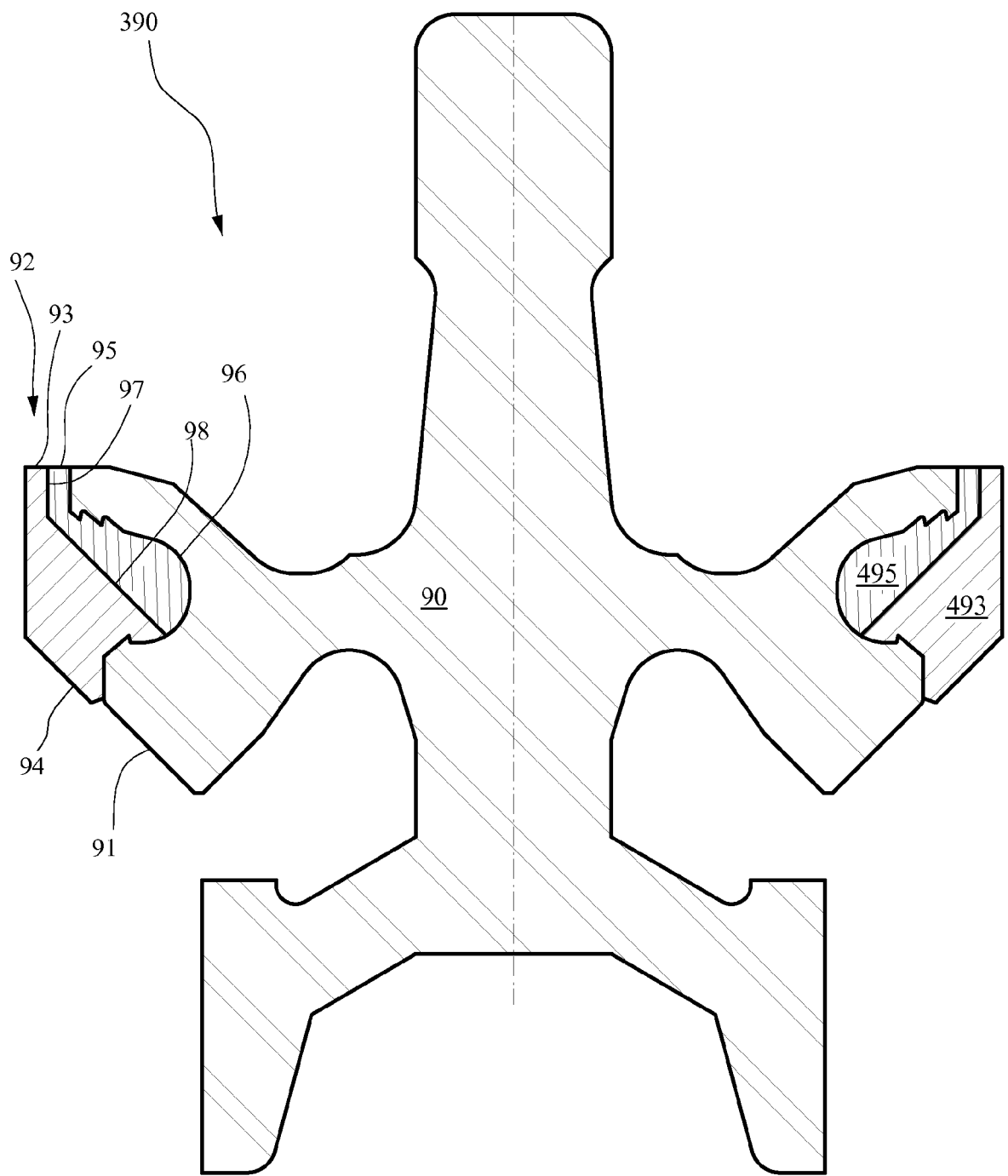
FIG. 7A schematically illustrates a cross-section showing a cast-in-place dual-durometer elastomeric seal having a non-planar intra-seal interface between first and second sections of the seal, the interface having predetermined geometric relationships with valve body and seal assembly structures.
Figure 7B:
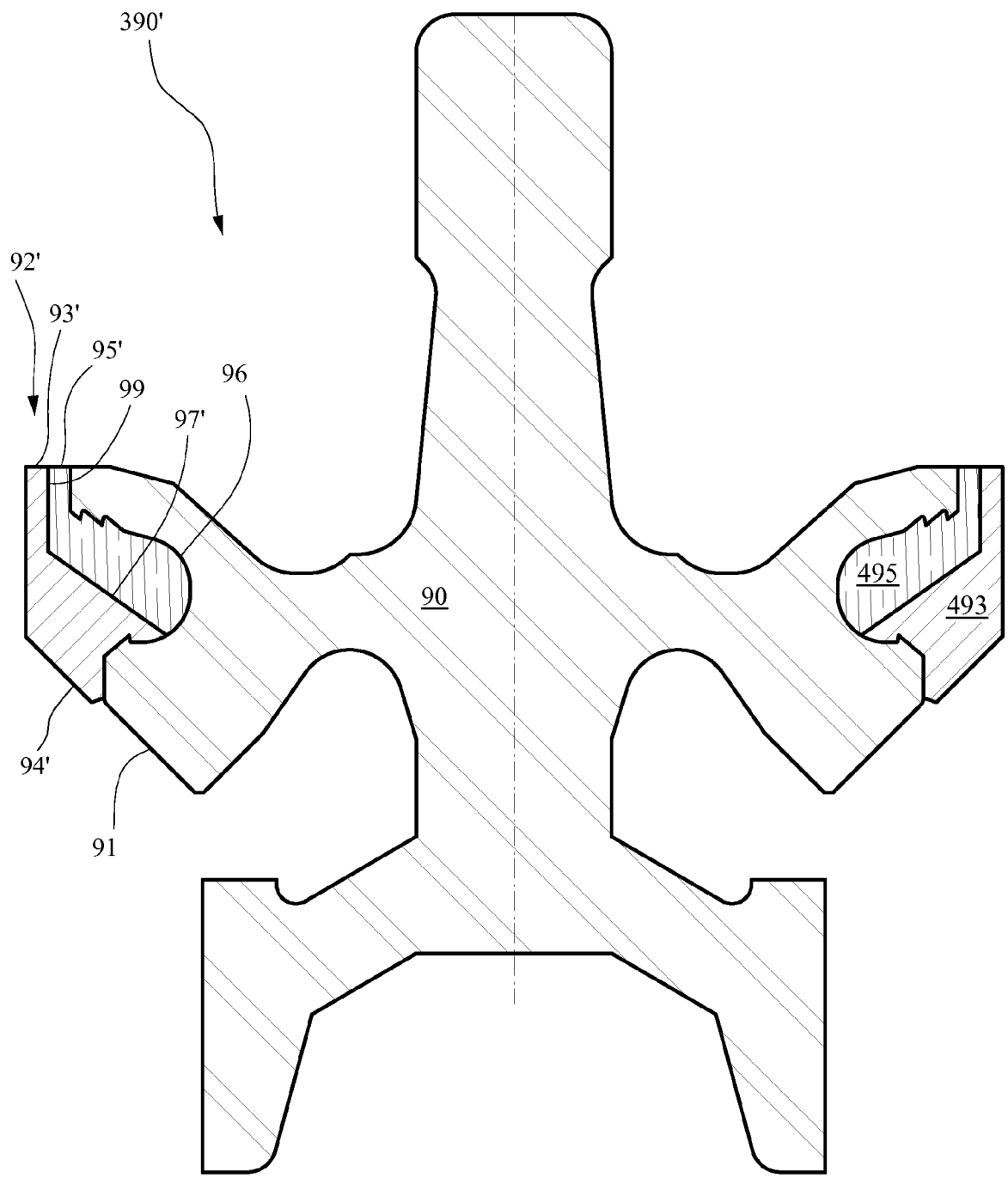
FIG. 7B schematically illustrates a cross-section showing an alternate cast-in-place dual-durometer elastomeric seal having a non-planar intra-seal interface between first and second sections of the seal, the interface having alternate predetermined geometric relationships with valve body and seal assembly structures.
Figure 8:
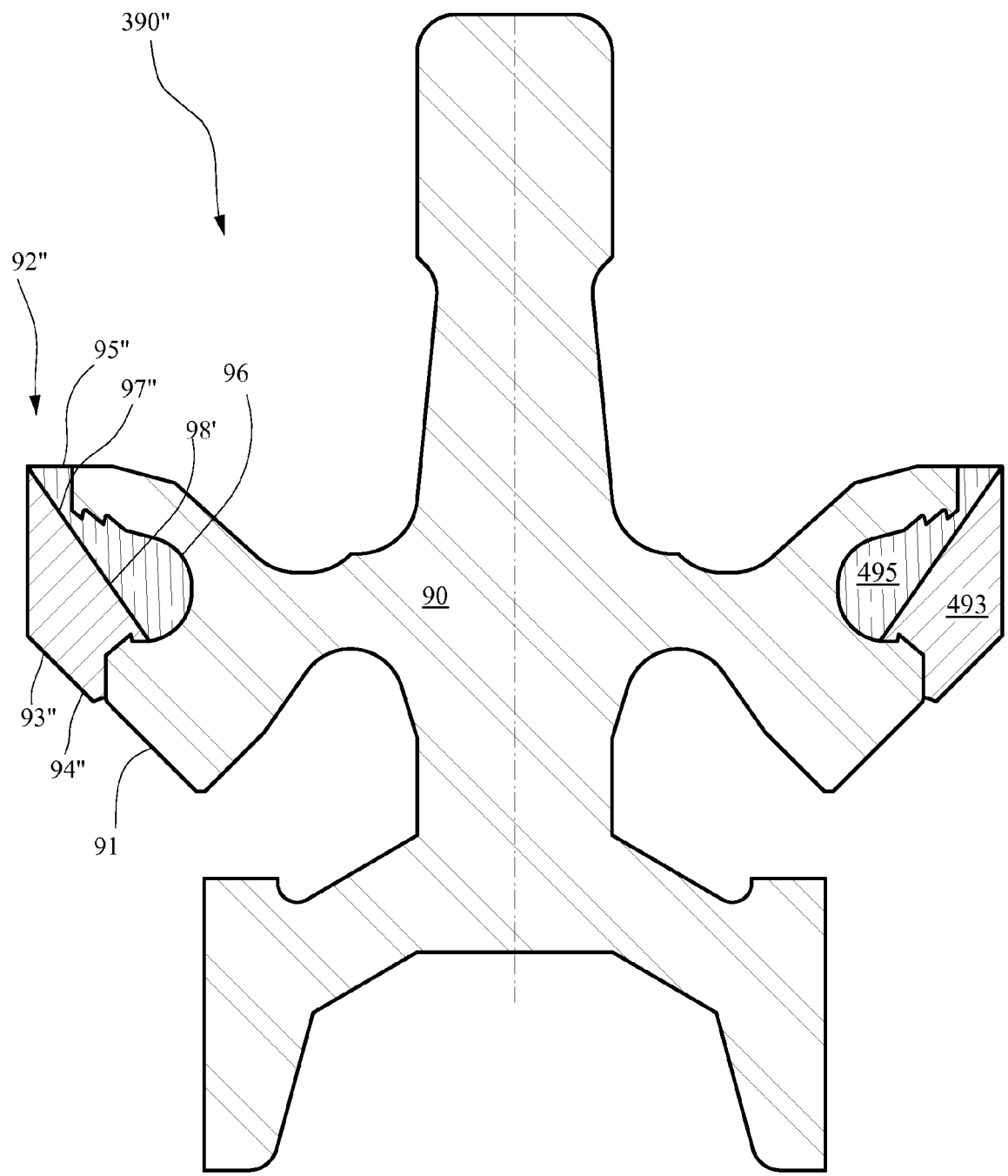
FIG. 8 schematically illustrates a cross-section showing a cast-in-place dual-durometer elastomeric seal having a non-planar intra-seal interface between first and second sections of the seal, the interface having a frusto-conical non-planar portion.

Certain elements of the first, second and third embodiments of a valve body and seal assembly described herein are identical and are identically labeled as they are schematically illustrated in FIGS. 7A, 7B and 8 respectively. But geometric descriptions (relating, e.g., to shape and/or orientation of certain seal structural features) differ among the elastomeric seals schematically illustrated in FIGS. 7A, 7B and 8. These geometric descriptions relate to different configurations of the first and second seal sections (and the non-planar intra-seal interface between the first and second sections) appropriate for different operational requirements.

For example, each elastomeric seal configuration in the valve body and seal assemblies described herein confers operational advantages that may have relatively greater importance in certain applications. In the seal configuration shown in FIG. 8, the edge of a major portion of the intra-seal interface is seen in section to be more nearly vertical (meaning the major interface portion has a more cylindrical character) than analogous edges of major portions of the intra-seal interfaces shown in FIGS. 7A and 7B. Thus, the shear component of residual elastomer shrinkage stress at the major portion of the interface of FIG. 8 would tend to be less than the shear component of residual elastomer shrinkage stress in major portions of the interfaces of FIGS. 7A and 7B. On the other hand, the intra-seal interface configuration of FIG. 7A would minimize transmission of any shear component of stresses secondary the pressure forces associated with valve closure.

Thus, a preferred distribution of elastomer stress for a certain elastomeric seal configuration may be influenced by specification of the relationships of portions of the intra-seal interface to each other and/or to other surfaces in the valve body and seal assembly as, for example, coaxial, geometrically similar (different size, same angular orientation), geometrically non-similar (different size, different angular orientation), or geometrically congruent (same size, same angular orientation). Adjustment of the interrelationships of such surfaces and/or portions in a particular valve body and seal assembly configuration to optimize performance (e.g., seal preload, leakage control, and/or susceptibility to extrusion damage) in a particular application is a problem in multivariate analysis that can be addressed using well-known techniques. Illustrative examples represented by the embodiments described herein constitute a sampling of typical design constraints.

A first embodiment of a valve body and seal assembly 390 (see FIG. 7A) has a longitudinal axis, valve body and seal assembly 390 comprising a valve body 90 substantially symmetrical about the longitudinal axis. Valve body 90 has one circumferential seal retention groove 96 and a frusto-conical valve body impact area 91 for contacting a valve seat. Valve body and seal assembly 390 further comprises an elastomeric seal 92 cast-in-place in circumferential seal retention groove 96, elastomeric seal 92 being substantially symmetrical about the longitudinal axis.

Elastomeric seal 92 (see FIG. 7A) is substantially symmetrical about the longitudinal axis and comprises a first seal section 93 having a frusto-conical external surface portion 94 for contacting a valve seat. First seal section 93 comprises a first polyurethane 493. Elastomeric seal 92 further comprises a second seal section 95, at least a portion of second seal section 95 lying between circumferential seal retention groove 96 and at least a portion of first seal section 93. Second seal section 95 contacts first seal section 93 along a substantially non-planar intra-seal interface 97, and second seal section 95 comprises a second polyurethane 495 having a lower modulus than first polyurethane 493. Further, substantially non-planar intra-seal interface 97 comprises a frusto-conical portion 98 substantially geometrically similar to frusto-conical valve body impact area 91 and substantially geometrically similar to first seal section frusto-conical external surface portion 94.

A second embodiment of a valve body and seal assembly 390' (see FIG. 7B) has a longitudinal axis, valve body and seal assembly 390' comprising a valve body 90 substantially symmetrical about the longitudinal axis. Valve body 90 has at least one circumferential seal retention groove 96 and a valve body impact area 91 for contacting a valve seat. Valve body and seal assembly 390' further comprises an elastomeric seal 92' cast-in-place in circumferential seal retention groove 96, elastomeric seal 92' being substantially symmetrical about the longitudinal axis.

Elastomeric seal 92' (see FIG. 7B) comprises a first seal section 93' having a frusto-conical external surface portion 94' for contacting a valve seat. First seal section 93' comprises a first polyurethane 493. Elastomeric seal 92' further comprises a second seal section 95', at least a portion of second seal section 95' lying between circumferential seal retention groove 96 and at least a portion of the first seal section 93'. Second seal section 95' contacts first seal section 93' along a substantially non-planar intra-seal interface 97', and the second seal section 95' comprises a second polyurethane 495 having a lower modulus than first polyurethane 493. Further, substantially non-planar intra-seal interface 97' comprises at least one cylindrical portion 99 coaxial with first seal section 93'.

A third embodiment of a valve body and seal assembly 390" (see FIG. 8) has a longitudinal axis, valve body and seal assembly 390" comprising a valve body 90 substantially symmetrical about the longitudinal axis. Valve body 90 has at least one circumferential seal retention groove 96 and a valve body impact area 91 for contacting a valve seat. Valve body and seal assembly 390" further comprises an elastomeric seal 92" cast-in-place in circumferential seal retention groove 96, elastomeric seal 92" being substantially symmetrical about the longitudinal axis.

Elastomeric seal 92" (see FIG. 8) comprises a first seal section 93" having a frusto-conical external surface portion 94" for contacting a valve seat, first seal section 93" comprising a first polyurethane 493. Elastomeric seal 92" further comprises a second seal section 95", at least a portion of second seal section 95" lying between one circumferential seal retention groove 96 and at least a portion of first seal section 93". Second seal section 95" contacts first seal section 93" along a substantially non-planar intra-seal interface 97", and second seal section 95" comprises a second polyurethane 495 having a lower modulus than first polyurethane 493. Substantially non-planar intra-seal interface 97" comprises at least one frusto-conical portion 98' not substantially geometrically similar to frusto-conical valve body impact area 91.

Figure 9:
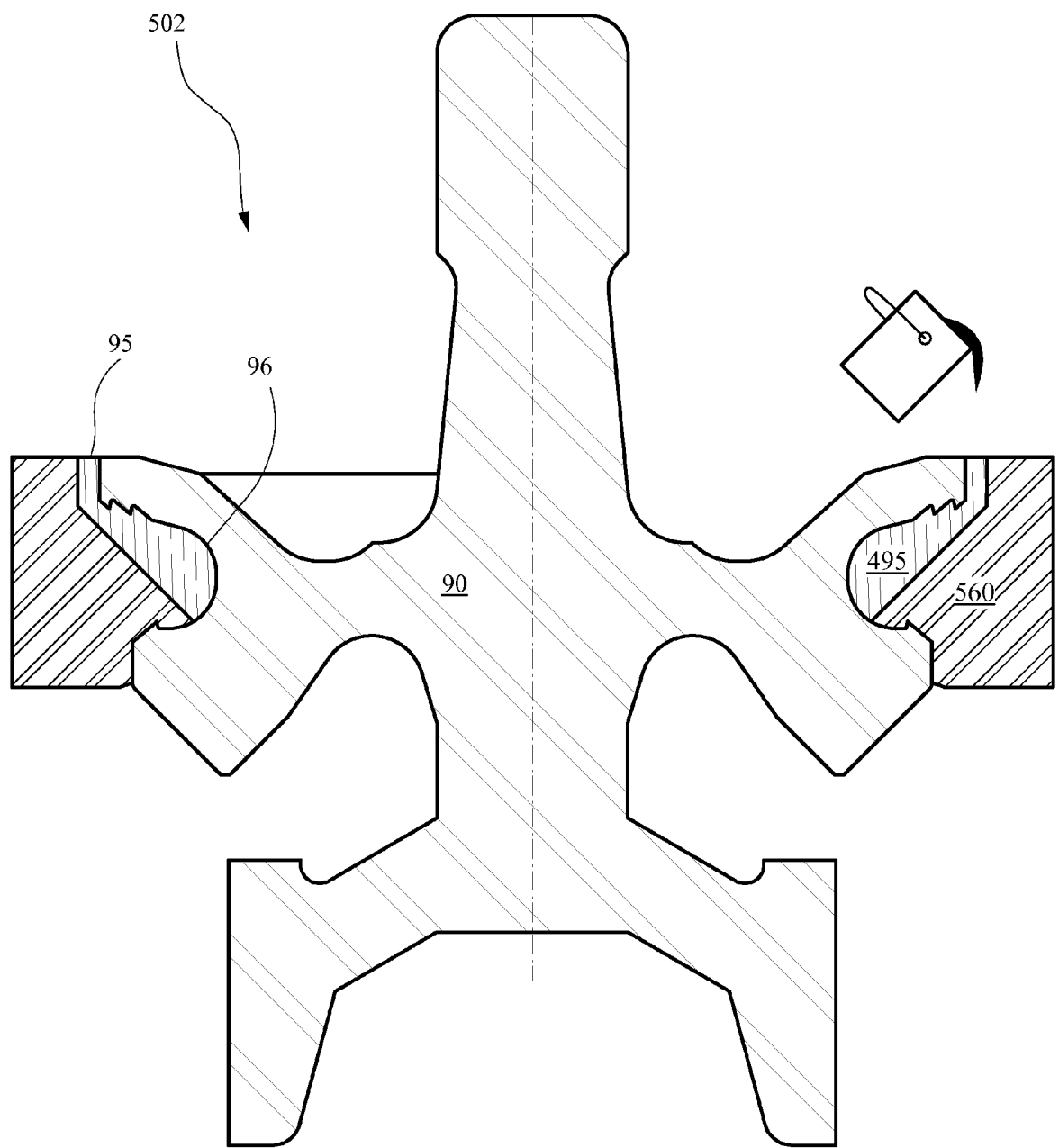
FIG. 9 schematically illustrates a cross-section showing casting-in-place of a second seal section of a dual-durometer elastomeric seal.

FIG. 9 schematically illustrates a mold 502 comprising a circumferential seal retention groove 96 of a valve body 90 (see also FIGS. 7A, 7B and 8). Mold 502 also comprises mold shell 560, which mates with valve body 90. In use, mold shell 560 is temporarily mated with valve body 90 to form mold 502. A second liquid elastomer 495 (liquid urethane for example) is poured into mold 502 and cured therein to form a second seal section 95 cast-in-place. During curing of second seal section 95, normal shrinkage of the elastomer 495 takes place about central portions of circumferential seal retention groove 96, creating residual shrinkage stress in second seal section 95. After second seal section 95 is cured, mold shell 560 will be removed and any necessary elastomer trimming performed prior to casting-in-place first seal section 93.

Figure 10:
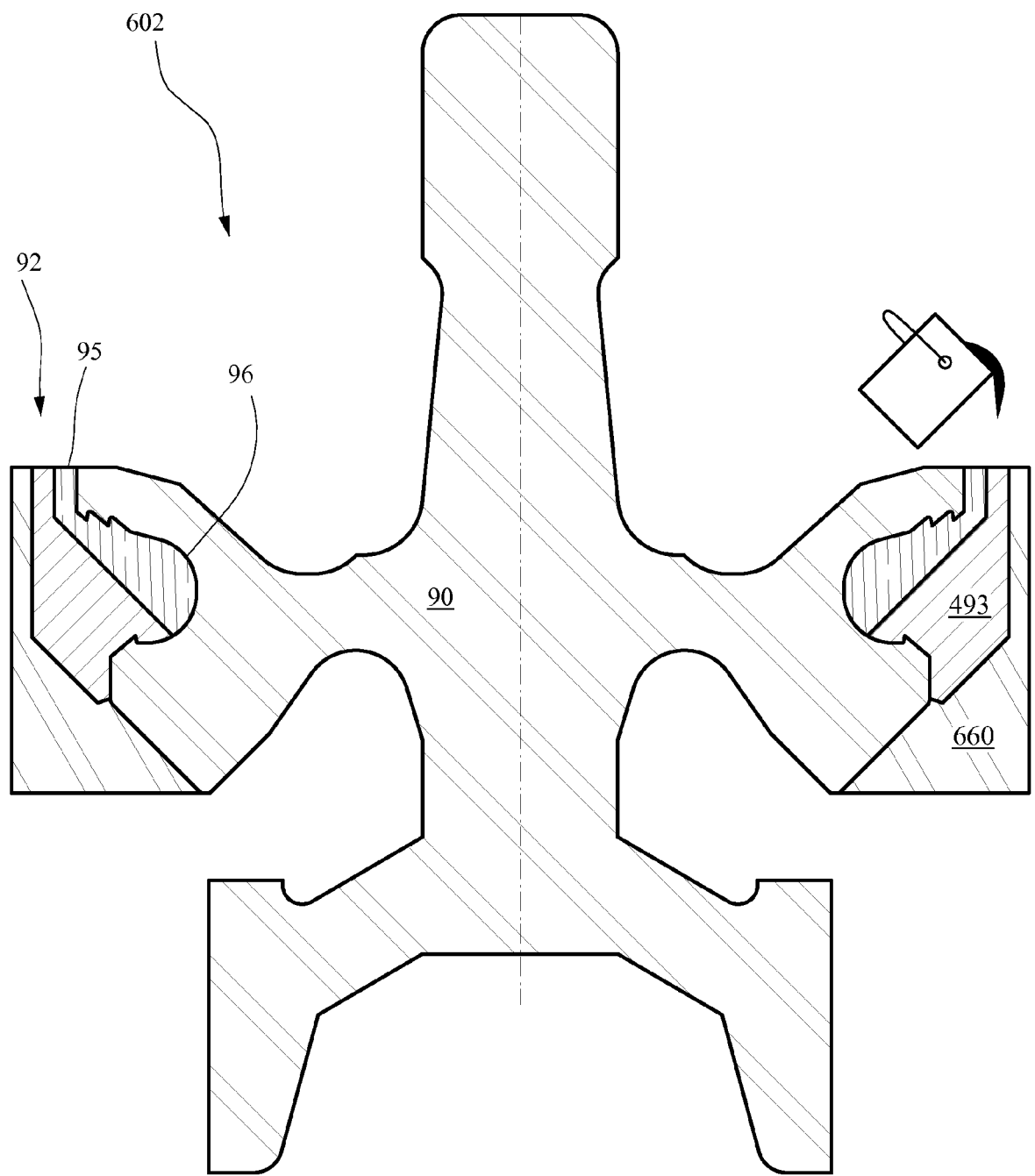
FIG. 10 schematically illustrates a cross-section showing casting-in-place of a first seal section of a dual-durometer elastomeric seal, the firs seal section contacting the second seal section shown in FIG. 9 along a substantially non-planar intra-seal interface having frusto-conical and cylindrical non-planar portions.

FIG. 10 schematically illustrates a mold 602 comprising a portion of second seal section 95 and a portion of circumferential seal retention groove 96 of a valve body 90 (see also FIGS. 7A, 7B and 8). Mold 602 also comprises mold shell 660, which mates with valve body 90. In use, mold shell 660 is temporarily mated with valve body 90 to form mold 602. A first liquid elastomer 493 (liquid urethane for example) is poured into mold 602 and cured therein to form a first seal section 93 cast-in-place. During curing of first seal section 93, normal shrinkage of the elastomer 493 takes place, tending to compress at least a portion of second seal section 95, creating additional residual shrinkage stress in second seal section 95, plus residual shrinkage stress in first seal section 93. After first seal section 93 is cured, mold shell 660 will be removed and any necessary trimming performed. Note that the second liquid elastomer 495, after casting and curing, has a lower modulus than that of the first liquid elastomer 493, after casting and curing.

Figure 11:
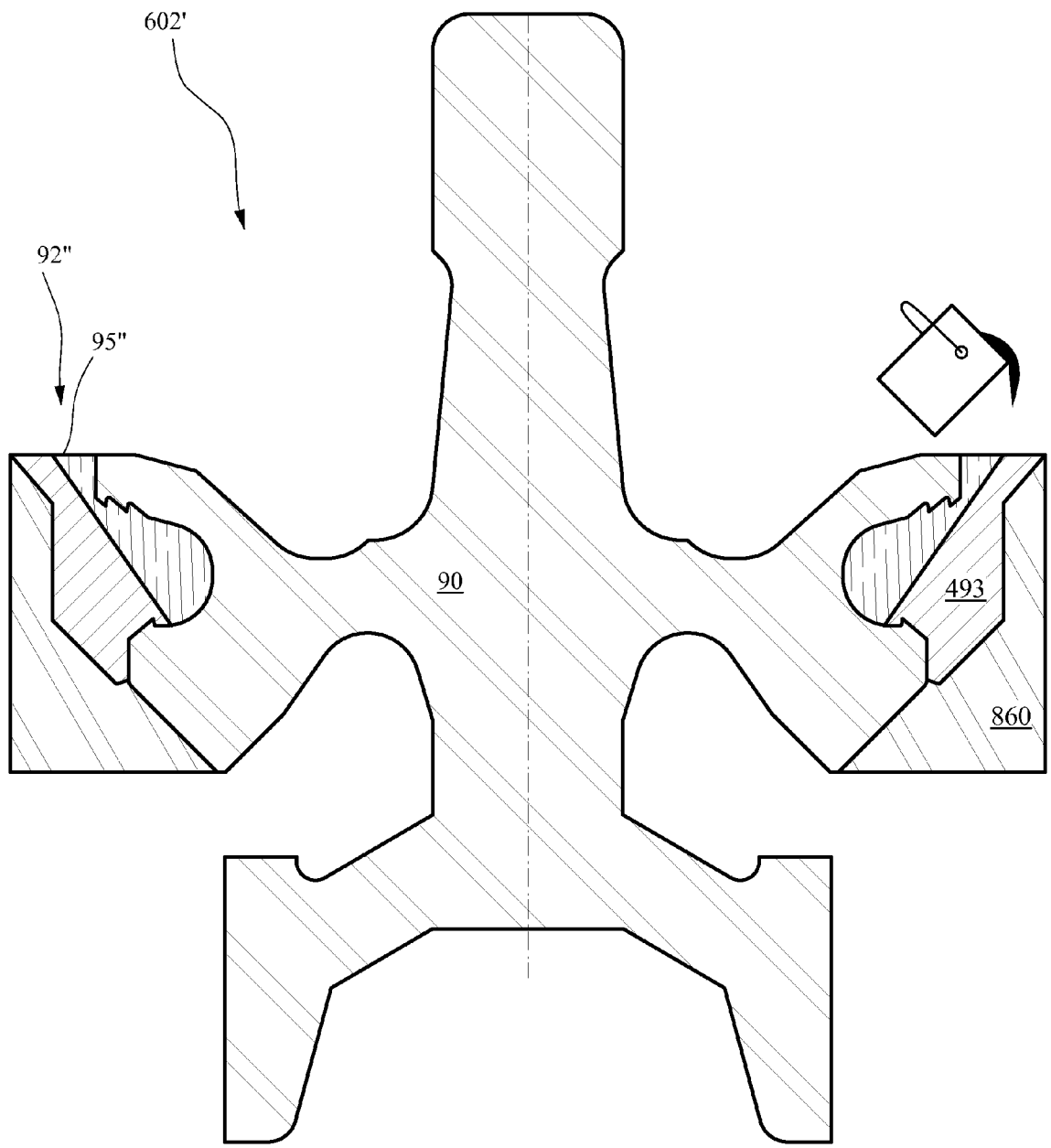
FIG. 11 schematically illustrates a cross-section showing casting-in-place of an alternative first seal section of a dual-durometer elastomeric seal, the first seal section contacting the second seal section along a substantially non-planar intra-seal interface substantially comprising a frusto-conical portion.

Methods analogous in part to those schematically illustrated in FIGS. 9 and 10 can be used to produce a variety of the valve body and seal assemblies described herein. For example, analogous methods incorporating mold shells 560' and 660' respectively can be employed to produce elastomeric seal 92' in a valve body and seal assembly 390'. FIG. 11 schematically illustrates casting-in-place of first seal section 93" using mold 602' (i.e., mold shell 860 mated with valve body 90). Second seal section 95" (see FIG. 11) was previously cast-in-place using a technique analogous in part to that schematically illustrated in FIG. 9, but using mold shell 760 (not shown). Finish machining would include trimming the outside corner of the outer surface of cured elastomer 493 to obtain a seal configuration analogous in part to that of FIG. 8.

Figure 12:
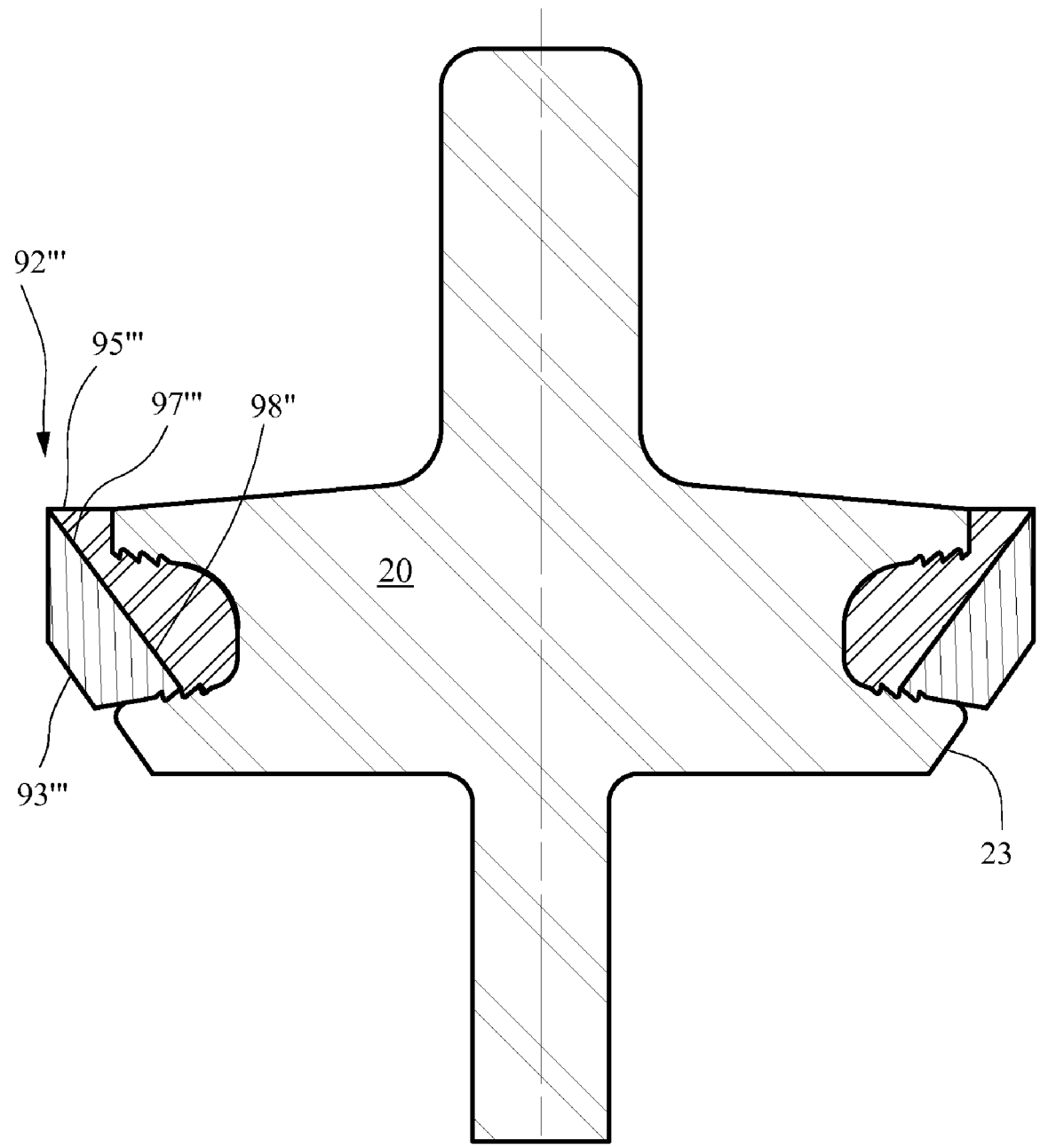
FIG. 12 schematically illustrates a cross-section showing a stem-guided valve body 90' having a cast-in-place dual-durometer elastomeric seal having a non-planar intra-seal interface between first and second sections of the seal, the interface having a frusto-conical non-planar portion analogous in part to the elastomeric seal shown in FIG. 8.

FIG. 12 schematically illustrates a cross-section showing a stem-guided valve body 20 with a frusto-conical valve body impact area 23 (see, e.g., FIG. 6) having a cast-in-place dual-durometer elastomeric seal 92''' with a non-planar intra-seal interface 97''' between first section 93''' and second section 95''' of the seal 92'''. Interface 97''' has a frusto-conical portion 98'' not substantially geometrically similar to frusto-conical valve body impact area 23 and thus analogous in part to the elastomeric seal shown in FIG. 8.

Mold surfaces coming into contact with the elastomer(s) as a seal section is cast-in-place are typically chosen and/or prepared so as to inhibit adhesion of the elastomer to each such surface, rather than to encourage the bonding taught in the '995 patent. Adhesion-inhibiting properties of a mold-elastomer interface may be obtained by appropriate choice of materials for the mold and the elastomer, and/or by subsequent treatment of these materials. For example, if a valve body is quenched in oil after heat-treatment (e.g., carburization), a thin layer of the quenching oil may be retained on the seal retention groove after quenching is completed for treating the groove to increase its adhesion-inhibiting properties. An adhesion-inhibiting seal retention groove may also be prepared, for example, by polishing the groove and/or by the applying to the groove one or more layers of non-stick materials such as oils, greases, waxes or plastics having properties similar to Teflon®. In each case, an elastomeric seal cast-in-place in contact with adhesion-inhibiting surfaces preferably exhibits minimal or no adherence to such surfaces during curing. That is, forces due to adhesion of the elastomer to mold surfaces, if present, will not materially add to the elastomer's background stress and thus will not materially reduce service life through damage similar to that schematically illustrated in FIG. 1A.

Valve body and seal assemblies disclosed herein may optionally comprise offset circular serrations of predetermined height on first and second opposing walls of an integral seal retention groove that is spaced apart from the valve body longitudinal axis. Offset serrations (or groups of serrations) on the first and second opposing walls are located at different distances from the longitudinal axis. Where a plurality of serrations are grouped on one or both of the opposing groove walls, distance from the longitudinal axis attributed to a serration group is the mean distance from the longitudinal axis for serrations within that group.

First opposing walls of the insert seal retention grooves on valve bodies are closer than second opposing walls to an area of high impact loads because they are closer to a peripheral metal sealing surface (valve body impact area) on the valve body flange. Thus, the periphery of first opposing walls is subject to relatively higher impact stress than other parts of the opposing groove walls when the valve body strikes the valve seat.

Second opposing walls, while more distant from the site of maximum metal-to-metal impact stress than first opposing walls, nevertheless experience significant bending stress due to forces transmitted to them through the seal. This bending stress on the second opposing groove wall is lowest peripherally and highest centrally (i.e., highest in that part of the wall that is closest to the longitudinal axis of the valve body). The area of maximum bending stress on second opposing groove walls is more central than the area of maximum metal-to-metal impact stress on first opposing walls because second opposing walls are effectively cantilevered peripherally from the most centrally located area of the seal retention groove.

Because the periphery of first opposing walls sustains relatively high impact stress, serrations on first opposing walls are preferably located as far centrally on such groove walls as practicable to maximize the distance from the impact area and thus minimize stress build-up near the serrations (which act as stress raisers). In a stem-guided valve body having a longitudinal axis of symmetry, for example, this means that serrations on first opposing walls are located as close as practicable to the longitudinal axis of symmetry (i.e., relatively centrally in the seal retention groove).

On the other hand, the bending stress acting on the second opposing wall of an integral seal retention groove on a stem-guided valve body will typically be greatest near the portion of the second opposing wall nearest the longitudinal axis of symmetry. Hence, for the stem-guided valve body and seal assemblies described herein, serrations on second opposing walls are located as far as practicable from the longitudinal axis of symmetry (i.e., peripherally, relative to the centrally-placed serrations on the first opposing walls as noted above).

Serrations (or serration groups) on first and second groove walls are therefore offset. Serration offset, in turn, minimizes the detrimental stress-raising effects of the serrations on their respective valve body flange areas. Additionally, use of offset serrations means that retaining forces exerted on an elastomeric seal in a groove by serrations on the opposing groove walls are further spaced apart as a function of the offset distance. This further spacing apart adds to the separation of forces acting on the seal and thus reduces stress concentration in the seal elastomer that would tend to tear the seal apart. Reduced stress concentration, in turn, results in reduced elastomer stress for valve body and seal assemblies disclosed herein.

Note that curvature of groove walls toward the center of the groove is allowable if the resulting curved wall would not trap air bubbles in liquid elastomer when the valve body is in position for casting of a seal in the groove. Included angle measurements for any curved portion of the groove wall are preferably made using the chord of any such curved portion.

What is claimed is:

1. A valve body and seal assembly having a longitudinal axis, said valve body and seal assembly comprising:
   a valve body substantially symmetrical about said longitudinal axis, said valve body having at least one circumferential seal retention groove and a frusto-conical valve body impact area for contacting a valve seat; and
   an elastomeric seal cast-in-place in at least one said circumferential seal retention groove, each said elastomeric seal being substantially symmetrical about said longitudinal axis and comprising:
      a first seal section having a frusto-conical external surface portion for contacting a valve seat, said first seal section comprising a first polyurethane; and
      a second seal section, at least a portion of said second seal section lying between one said circumferential seal retention groove and at least a portion of said first seal section, said second seal section contacting said first seal section along a substantially non-planar intra-seal interface, and said second seal section comprising a second polyurethane having a lower modulus than said first polyurethane;
   wherein said substantially non-planar intra-seal interface comprises at least one frusto-conical portion substantially geometrically similar to said frusto-conical valve body impact area and substantially geometrically similar to said first seal section frusto-conical external surface portion.

2. The valve body and seal assembly of claim 1, wherein said first seal section first polyurethane is not bonded with said second seal section second polyurethane.

3. The valve body and seal assembly of claim 1, wherein said first seal section first polyurethane is bonded with said second seal section second polyurethane at said intra-seal interface.

4. The valve body and seal assembly of claim 1, wherein said first seal section additionally comprises a cylindrical external surface portion.

5. The valve body and seal assembly of claim 1, wherein said first seal section comprises polyurethane of about 95 durometer Shore A hardness to about 60 durometer Shore D hardness.

6. The valve body and seal assembly of claim 5, wherein said second seal section comprises polyurethane of about 75 to about 85 durometer Shore A hardness.

7. The valve body and seal assembly of claim 1, wherein said second seal section comprises at least one external surface portion.

8. The valve body and seal assembly of claim 1, wherein said second seal section comprises no external surface portion.

9. A valve comprising the valve body and seal assembly of claim 1 and a valve seat.

10. A valve comprising the valve body and seal assembly of claim 6 and a valve seat.

11. A valve body and seal assembly having a longitudinal axis, said valve body and seal assembly comprising:
   a valve body substantially symmetrical about said longitudinal axis, said valve body having at least one circumferential seal retention groove and a frusto-conical valve body impact area for contacting a valve seat; and
   an elastomeric seal cast-in-place in at least one said circumferential seal retention groove, each said elastomeric seal being substantially symmetrical about said longitudinal axis and comprising:
      a first seal section having a frusto-conical external surface portion for contacting a valve seat, said first seal section comprising a first polyurethane; and
      a second seal section, at least a portion of said second seal section lying between one said circumferential seal retention groove and at least a portion of said first seal section, said second seal section contacting said first seal section along a substantially non-planar intra-seal interface, and said second seal section comprising a second polyurethane having a lower modulus than said first polyurethane;
   wherein said substantially non-planar intra-seal interface comprises at least one cylindrical portion coaxial with said first seal section.

12. The valve body and seal assembly of claim 11, wherein said first seal section first polyurethane is not bonded with said second seal section second polyurethane.

13. The valve body and seal assembly of claim 11, wherein said first seal section first polyurethane is bonded with said second seal section second polyurethane at said intra-seal interface.

14. The valve body and seal assembly of claim 11, wherein said first seal section comprises polyurethane of about 95 durometer Shore A hardness to about 60 durometer Shore D hardness.

15. The valve body and seal assembly of claim 14, wherein said second seal section comprises polyurethane of about 75 to about 85 durometer Shore A hardness.

16. A valve comprising the valve body and seal assembly of claim 11 and a valve seat.

* * * * *